United States Patent [19]
Palmer et al.

[11] Patent Number: 6,058,971
[45] Date of Patent: May 9, 2000

[54] QUICK-CONNECT DIVERTER VALVE

[75] Inventors: Carl W. Palmer; Kenneth Rawald, both of Dana Point; Jeffrey DeLong, Yorba Linda, all of Calif.

[73] Assignee: Seychelle Environmental Technologies, Inc., San Clemente, Calif.

[21] Appl. No.: 09/144,589

[22] Filed: Aug. 31, 1998

[51] Int. Cl.⁷ .................................................. F16K 11/00
[52] U.S. Cl. .................. 137/599.1; 137/562; 137/625.29
[58] Field of Search .................. 137/562, 599.1, 137/625.29, 625.5; 239/447, 575; 210/264, 282, 416.3, 424, 433.1, 443

[56] References Cited

U.S. PATENT DOCUMENTS

| | | | |
|---|---|---|---|
| 1,351,781 | 9/1920 | Meushaw et al. | 137/599.1 |
| 5,192,436 | 3/1993 | Sasaki et al. | 210/264 |
| 5,421,813 | 6/1995 | Ohnishi | 137/599.1 |

*Primary Examiner*—J. Casimer Jacyna
*Attorney, Agent, or Firm*—James G. O'Neill

[57] ABSTRACT

A quick-connect diverter valve for use in connecting existing water faucets and water filtration units in and around a kitchen, or other areas where clean drinking water is desired. The device consists of a body having a movable sleeve adaptor at one end and an outlet opening at the other end. The sleeve adaptor is slidable to allow the body to be quickly inserted onto and held in an annular groove formed on a snap adapter secured to an outlet end of an existing faucet or tap. The body of the device includes a central chamber having an easily operated piston valve member which is slidingly held therein so that upon actuation of an operating member, the valve member is moved in a first direction to allow entering water to flow from the device into a water filter and back from the water filter through a further chamber and out the outlet end of the device. The valve member may be slid in a second direction to block flow to the water filter so that tap water will flow directly through the device and out through the outlet end.

20 Claims, 1 Drawing Sheet

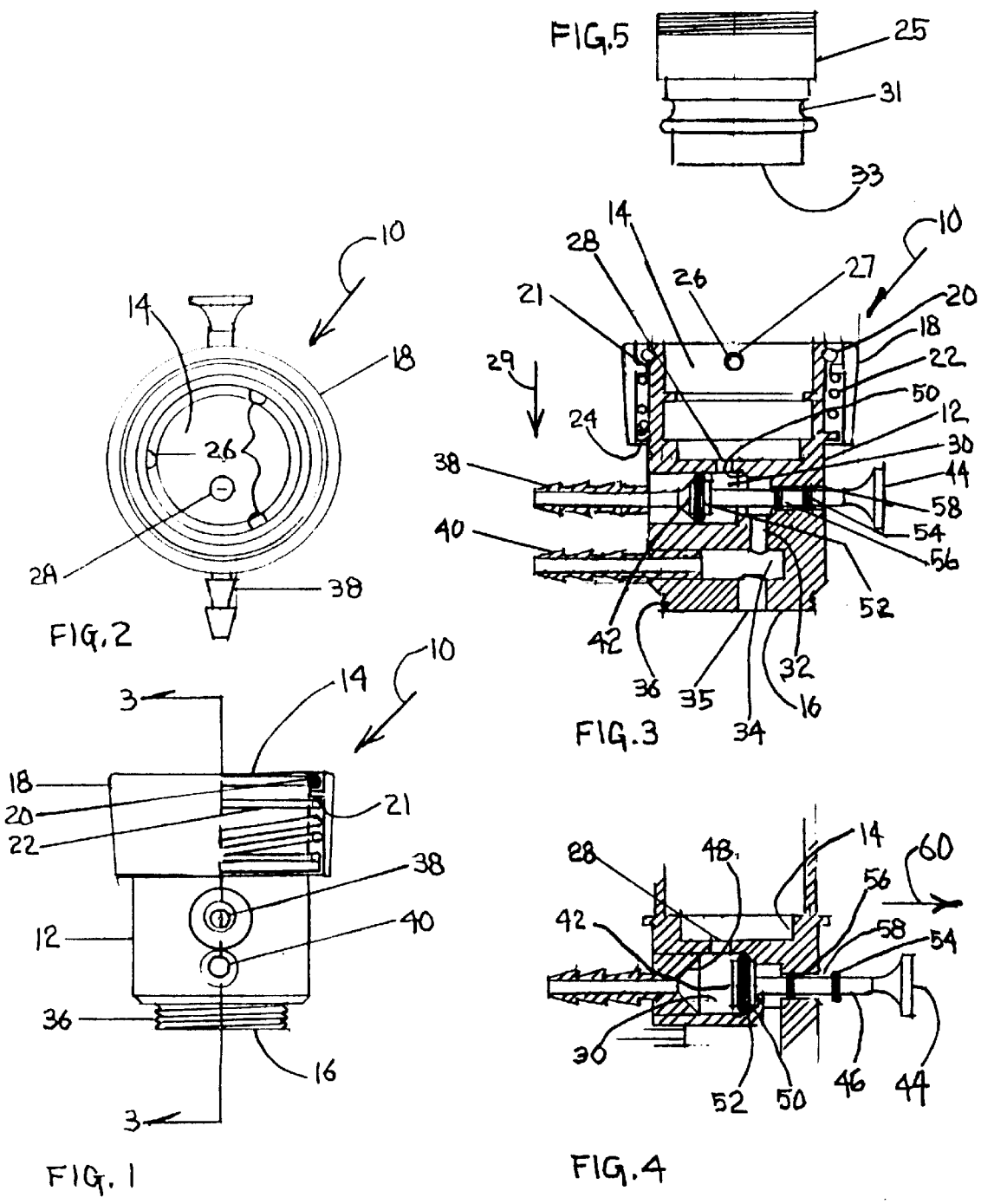

QUICK-CONNECT DIVERTER VALVE

BACKGROUND OF THE INVENTION

1. Field of the Invention

This invention relates generally to fluid control devices, and, more particularly, to a quick-connect diverter valve for use with water faucets for easy connection to a water filtration unit.

2. Description of Related Art

Recent surveys have indicated that a significant percentage of the water obtained from individual faucets or taps in homes and other locations contain one or more bacteriological or chemical constituents that exceed acceptable limits set forth in local and federal standards. To overcome the potential dangers to public health, and the like, from the use of potentially dangerous water, a marked increase in the use of bottled water is occurring. At the same time, there are a number of point-of-use purification devices available. These include in-line filters, under the sink filters, free-standing, drink-size separate units and filter devices that attach to the conventional sink faucet or tap, or to the typical aerator secured to such sink faucet or tap.

Many such devices that secure under the sink or are freestanding have a remote spout adjacent to or on the device, where filtered water is dispensed into a glass or other container. Quick-connect or disconnect devices are also known for use with water faucets or taps whereby an aerator or other device may be connected to the end of the faucet or tap. Additionally, many types of valves are known for controlling the flow of water through a faucet or tap, or in other types of fluid flow control devices. However, there is no known quick-connect diverter valve which provides for easy connection between water faucets or taps and the various types of water filter systems presently on the market.

Therefore, there exists a need in the art for a quick-disconnect diverter valve, usable with any faucet or tap having an appropriate terminating portion to which the quick-disconnect device may be attached, and which quick-connect diverter device selectively allows either straight tap water or filtered water to flow from the outlet end of the diverter valve.

SUMMARY OF THE INVENTION

It is, therefore, a general object of the present invention to provide an improved and simplified quick-connect diverter valve. It is a particular object of the present invention to provide an improved quick-connect device that may be used with various types of water filtration products. It is yet another particular object of the present invention to provide an improved quick-connect diverter valve which is designed so as to selectively allow either straight tap water or filtered water to flow from the same outlet. It is another particular object of the present invention to provide an improved quick-connect diverter valve having a pair of tubes to which a water filter may be attached. It is still another particular object of the present invention to provide an improved quick-connect diverter valve having a diverter shaft operated by a knob extending exteriorly thereof. And, it is a still further particular object of the present invention to provide an improved quick-connect diverter valve incorporating a diverter shaft operated by an exterior knob so as to selectively allow tap water or filtered water to flow through the outlet of the diverter valve.

These and other objects and advantages of the present invention are achieved by providing a quick-connect diverter valve having a spring operated attachment collar at one end for connection to an outlet of a water faucet or tap via a snap adaptor or aerator designed with an annular groove to hold the quick disconnect diverter valve. The diverter valve has an outlet connected by a through passage formed at the other end of the diverter valve. The through passage also connects to a pair of inlet and outlet conduits which may be connected via hoses, or the like, to a water filter. A knob operated diverter shaft and valve is located in the diverter valve so as to control the flow of water through the diverter valve or alternately through the second outlet to a water filter and back from the water filter to the outlet of the diverter valve.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1 is a front elevational view of a preferred embodiment of a quick-connect diverter valve, partially broken away, of the present invention;

FIG. 2 is a top plan view of FIG. 1;

FIG. 3 is a cross sectional view, taken along line A—A of FIG. 1;

FIG. 4 is a partial cross sectional view similar to FIG. 3, showing a diverter valve knob and shaft operated so as to move a valve member to direct the flow of water from a water faucet or tap out through an exit conduit to a water filter, and back into an inlet conduit for flow of filtered water through the diverter valve outlet; and FIG. 5 is a front elevational view of a snap adapter or aerator for the outlet end of a faucet or tap.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for improved quick-connect diverter valve, generally indicated at 10, for use in allowing tap water to pass through the diverter valve, or alternatively to direct the tap water through a filtering element and then back through the diverter valve.

Turning now to the drawings, there shown is one embodiment of the quick-connect diverter valve 10 of the present invention having an elongated body 12 with a water inlet 14 at a first end, and a water outlet 16 at the other or second end. The water inlet 14 is preferably surrounded by a movable collar 18, biased by a spring 22, held on the body 12 at the first end 14 by a retaining ring 20 held in an annular groove formed around the first end. Movable collar 18 includes an internal annular ridge 21, and the compression spring 22 is held between this internal annular ridge, and a lower flange 24 formed on the body 12. The spring 22 biases the collar 18 into the outer, holding or locking position shown in the drawing figures. The internal annular ridge 21 is sized and dimensioned so as to cooperate with a plurality of holding elements 26, such as ball bearings, cams, or the like, which protrude through openings 27 formed in an inner wall of the inlet 14. The openings 27 are smaller than the diameter of the balls 26 so that the inwardly protruding portions of the balls cooperate with an annular groove 31 formed in a snap adapter or aerator 25 (see FIG. 5), that attaches to or is threaded on an outlet end of a water faucet or tap. The device 10 may be simply and easily connected to the annular groove 31 in the snap adapter 25, by pressing the collar 18 downwardly, in the direction of arrow 29, against the compression of spring 22, toward the flange 24, thereby freeing the balls and allowing them to be moved outwardly, away from the inlet 14, so as to allow the outlet 33 of the snap adapter on a faucet or tap to be inserted and held in the interior of inlet end 14. Upon withdrawal of the collar or allowing the collar to be returned to its normal or rest position shown, the inwardly protruding portions of the balls or cams 26 will then be held within the annular groove by the annular ring 21, thereby holding the quick-connect diverter valve 10 of the present invention on the snap adapter 25 at the outlet end of the faucet or tap, until the collar 18 is actuated to remove the diverter valve 10.

As best shown in FIGS. 3–5, water coming from the outlet end 33 of the snap adapter 25 entering the inlet 14 will first pass through an inlet opening or passage 28 and flow into an elongated stepped internal chamber 30, then through a further opening or passage 32, down through a further internal chamber 34, and then out outlet end 16, through an outlet opening or passage 35. The outlet end 16 is preferably threaded as shown at 36 to allow an aerator, of a type well known to those skilled in the art, to be attached to the outlet end.

The internal chamber 30 formed within the body 12 is shaped and dimensioned so as to be connected to an outlet conduit 38 having a barbed tip, while the internal chamber 34 is shaped and dimensioned so as to be connected to a further, or inlet conduit 40, also having a barbed tip. Plastic, rubber or other flexible hose may be attached to the conduits 38 and 40 for connection to a water filter inlet and outlet, respectively, not shown. Flow of incoming tap water from passage 28 into outlet conduit 38 is controlled by means of a piston valve member 42 held in chamber 30. This piston valve member is comprised of an exterior handle or knob 44 connected to piston valve 42 by a shaft 46. Valve seats 48, 50 are formed at each end of a cylindrical portion of internal chamber 30, and the valve member 42 is preferably cylindrical and has an O-ring, or other type of sealing member 52 thereon. Valve member 42 is movable between valve seats 48 or 50. That is, as shown in FIG. 3, when the knob 44 and valve 42 are pushed to the left, the valve 42 sealingly engages the valve seat 48, so that the flow of tap water goes directly through diverter valve 10, via passage 28, internal chamber 30, passage 32, chamber 34 and outlet opening 35, through any aerator attached to outlet end 16. The flow of water past valve 42 in chamber 30 will aid in forcing the valve and sealing member 52 into valve seat 48.

The shaft 46 also includes a pair of O-rings or other sealing members 54, 56 to prevent leakage of any fluid through an opening 58 in which the shaft 46 travels.

The further or second valve seat 50 is located on the right of the cylindrical inner portion of inner chamber 30, when looking at FIGS. 3 and 4, so that when the knob 44 is pulled outwardly, to the right, as shown by arrow 60 in FIG. 4, valve member 42 and sealing member 52 will be sealingly engaged with the second valve seat 50 so as to block fluid flow from chamber 30 into passage 32. Therefore, any water flowing into internal chamber 30 from passage 28 will travel through the outlet conduit 38, to a water filter, not shown.

After being filtered by the water filter, the filtered water will then return to the diverter valve 10, through inlet conduit 40, for flow into the lower chamber 34, and thus out through the outlet opening 35.

As the water passes through the valve body 12, from internal chamber 30 and through outlet conduit 38, the pressure of the water flow will force the piston valve member 42 and sealing ring 52 into seat 50, thus eliminating any leaks or contamination of filtered water. In addition, when the shaft 46 is pulled entirely outwardly by the knob 46 to the bypass position shown in FIG. 4, the outer O-ring 54 is preferably colored, for example, blue, so as to indicate that the diverter valve and valve member 42 are bypassing water to a water filter and filtered water is coming out through outlet opening 35.

If desired, a further spring element (not shown) may be added around the shaft 46, between the right hand side of the piston valve member 42 and the valve seat 50, so as to normally bias the valve member 42 into the closed position, against valve seat 48, as shown in FIG. 3, whereby unfiltered tap water is passing through the central chamber and exiting through outlet opening 35. Furthermore, if the valve member 42 and knob 44 are moved to the position shown in FIG. 4, and the flow of water through passage 28 into inner chamber 30 is stopped, the force of any added spring acting against the valve member 42 could be used to aid in returning the valve member 42 to the left hand seat 48, as shown in FIG. 3.

It, thus, can be seen that the present invention provides a quickly operated diverter valve device that may be used with various types of water filtration or treating systems for connection to a water faucet or tap. The device of the present invention is designed to allow both regular water direct from the tap, and filtered water, to flow through the same outlet opening at the exit end of the device, thus eliminating the need for remote spouts or a separate filter valve or working member. The diverter valve of the present invention is quick and easy to operate by one hand of a user, and includes indicating means to show that it is in the water filter position. The simplified and improved design of the present invention provides an easy-to-use, off-the-shelf element which may be quickly attached to an annular groove formed at the outlet of an existing water faucet or tap by the use of an available adaptor/aerator fitting.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than is specifically described herein.

What is claimed is:

1. A quick-connect diverter valve, comprising:
    an elongated body having an inlet end and an outlet end;
    a first chamber and a second chamber formed in the elongated body between the inlet end and the outlet end;
    an inlet passage formed in the body and connected to the first chamber;
    an outlet passage formed in the elongated body and connected to the outlet end;
    a further passage formed in the elongated body and connected between the first chamber and the second chamber;
    a spring biased movable collar mounted on the elongated body surrounding the inlet end;

an outlet conduit connected to the elongated body and the first chamber;

an inlet conduit connected to the elongated body and the second chamber; and a movable valve member held in the first chamber and selectively movable to divert water flowing through the inlet passage to either the outlet conduit or the further passage.

2. The quick-connect diverter valve of claim 1 wherein the movable valve member includes an operating handle mounted on the exterior of the elongated body.

3. The quick-connect diverter valve of claim 2 wherein the movable valve member is a piston valve and the first chamber includes a pair of opposed valve seats.

4. The quick-connect diverter valve of claim 3 wherein the piston valve is connected to the operating handle by a shaft.

5. The quick-connect diverter valve of claim 4 wherein the operating handle is a knob and the shaft is sealingly held in an opening formed in the elongated body and connected to the first chamber.

6. The quick-connect diverter valve of claim 5 wherein the movable collar is spring biased to a position where it cooperates with a plurality of balls extending through openings formed in the inlet end.

7. The quick-connect diverter valve of claim 5 wherein the piston valve includes a sealing means therein, and is slidably held in the first chamber and selectively movable between sealed positions against the pair of opposed valve seats.

8. The quick-connect diverter valve of claim 5 wherein the piston valve includes a further O-ring seal thereon.

9. The quick-connect diverter valve of claim 1 wherein the first chamber includes a cylindrical portion with opposed valve seats at opposite ends thereof and the movable valve member is a piston valve movable between the opposed valve seats by an external handle connected to the piston valve.

10. The quick-connect diverter valve of claim 9 wherein the external handle is a knob connected to the piston valve by a shaft, which shaft is sealingly held in an opening formed in the elongated body.

11. The quick-connect diverter valve of claim 10 wherein the shaft includes a pair of O-ring seals, with one of the pair of O-ring seals being blue to indicate the position of the piston valve member.

12. The quick-connect diverter valve of claim 11 wherein the movable collar is spring biased to a position where it cooperates with a plurality of holding elements extending through openings formed in the inlet end so as to be captured in an annular groove in an outlet of a water faucet.

13. A quick-connect diverter valve, comprising:

an elongated, cylindrical body having an inlet end and an outlet end;

a first cylindrical chamber and a second chamber formed in the elongated, cylindrical body between the inlet end and the outlet end;

an inlet opening formed in the inlet end body and connected to the first cylindrical chamber;

an outlet opening formed in the elongated, cylindrical body and connected to the outlet end;

a further opening formed in the elongated, cylindrical body and connected between the first cylindrical chamber and the second chamber;

a spring biased collar mounted on the elongated, cylindrical body surrounding the inlet end;

an outlet conduit connected to the elongated, cylindrical body and the first cylindrical chamber;

an inlet conduit connected to the elongated, cylindrical body and the second chamber; and a piston valve member movably held in the first cylindrical chamber and movable between a first valve seat and a second valve seat to selectively divert water flowing through the inlet opening to either the outlet conduit or the further opening.

14. The quick-connect diverter valve of claim 13 wherein the piston valve member includes an operating handle mounted on the exterior of the elongated, cylindrical body.

15. The quick-connect diverter valve of claim 14 wherein the piston valve is connected to the operating handle by a shaft sealingly held in an opening formed in the elongated, cylindrical body.

16. The quick-connect diverter valve of claim 15 wherein the piston valve includes an O-ring seal thereon, which O-ring seal cooperates with the first valve seat and the second valve seat.

17. The quick-connect diverter valve of claim 16 wherein the outlet conduit and the inlet conduit include barbed tips so that a resilient hose may be easily attached thereto.

18. The quick-connect diverter valve of claim 16 wherein the shaft has a first O-ring and a second O-ring mounted thereon, and the second O-ring is colored blue to indicate that the piston valve is in position to allow filter water to flow through the outlet end of the elongated body.

19. A quick-connect diverter valve, comprising:

an elongated body having an inlet end and an outlet end and a pair of internal chambers formed therein;

the pair of internal chambers including a first cylindrical chamber connected to an inlet opening and an outlet passage and an outlet conduit, and a second chamber connected to the first cylindrical chamber by an internal passage and further including an inlet conduit and an outlet opening;

a spring biased movable collar mounted on the inlet end;

a piston valve member having sealing means thereon movably held in the first cylindrical chamber between a first valve seat controlling flow from the inlet opening to the outlet passage; and an exterior operating knob connected to the piston valve member by a shaft sealingly held in an opening in the elongated body, connected to the first cylindrical chamber.

20. The quick-connect diverter valve of claim 19 wherein said spring biased movable collar is slidably movable to enable a plurality of holding elements to be operated so as to mount the quick-connect diverter valve on a snap adaptor held on the outlet end of a faucet.

* * * * *